(12) United States Patent
Oudshoorn et al.

(10) Patent No.: US 6,836,056 B2
(45) Date of Patent: Dec. 28, 2004

(54) LINEAR MOTOR HAVING PIEZO ACTUATORS

(75) Inventors: Mark Oudshoorn, Bradenton, FL (US); Jeff Moler, Sarasota, FL (US); R. Glenn Akhavein, Bradenton, FL (US); Mark Woozley, Valrico, FL (US); John Blatt, Jackson, WY (US)

(73) Assignee: Viking Technologies, L.C., Sarasota, FL (US)

( * ) Notice: Subject to any disclaimer, the term of this patent is extended or adjusted under 35 U.S.C. 154(b) by 493 days.

(21) Appl. No.: 09/777,478

(22) Filed: Feb. 5, 2001

(65) Prior Publication Data

US 2002/0000518 A1 Jan. 3, 2002

Related U.S. Application Data

(60) Provisional application No. 60/180,239, filed on Feb. 4, 2000, provisional application No. 60/198,056, filed on Apr. 18, 2000, and provisional application No. 60/220,542, filed on Jul. 25, 2000.

(51) Int. Cl.⁷ .................... H01L 41/08; H02N 2/00
(52) U.S. Cl. .................................................. 310/328
(58) Field of Search ........................................ 310/328

(56) References Cited

U.S. PATENT DOCUMENTS

| | | |
|---|---|---|
| 3,144,802 A | 8/1964 | Faber and Kirkwood |
| 3,614,486 A | 10/1971 | Smiley ........................ 310/328 |
| 3,666,975 A | 5/1972 | Balamuth ..................... 310/8.2 |
| 3,902,084 A | * 8/1975 | May, Jr. ...................... 310/26 |
| 3,905,085 A | 9/1975 | Bizzigotti ................... 310/328 |
| 4,018,124 A | 4/1977 | Rosado ........................ 84/1.16 |
| 4,044,239 A | 8/1977 | Shimauchi et al. ....... 235/151.3 |
| 4,088,052 A | 5/1978 | Hedrick ........................ 84/454 |
| 4,088,916 A | 5/1978 | Weineck et al. ............. 310/338 |
| 4,112,879 A | 9/1978 | Assenheimer et al. .. 123/32 EA |
| 4,157,802 A | 6/1979 | May, Jr. ...................... 248/346 |
| 4,196,652 A | 4/1980 | Raskin ......................... 84/458 |
| 4,207,791 A | 6/1980 | Murakami ................... 84/1.01 |
| 4,208,636 A | 6/1980 | German ..................... 331/94.5 |
| 4,228,680 A | 10/1980 | Engel et al. .............. 73/119 A |
| 4,313,361 A | 2/1982 | Deutsch ....................... 84/1.01 |

(List continued on next page.)

FOREIGN PATENT DOCUMENTS

| | | | |
|---|---|---|---|
| DE | 4220177 | 7/1994 | .......... H01L/41/09 |
| DE | 19946003 | 5/2000 | ............. F16K/7/00 |
| DE | 19946838 | 10/2000 | ......... H01L/41/083 |
| EP | 0 704 916 A1 | 11/1995 | .......... H01L/41/09 |
| JP | 61-150287 | 7/1986 | ................ 310/328 |
| JP | 62-23381 | * 1/1987 | ............ H02N/2/00 |
| JP | 62-217880 | 9/1987 | ................ 310/311 |
| JP | 1-152976 | * 6/1989 | ............ H02N/2/00 |
| JP | 2-260476 | 10/1990 | ................ 310/328 |
| JP | 3234981 | 10/1991 | ........... F16K/31/02 |
| JP | 4-165966 | * 11/1992 | ............ H02N/2/00 |
| JP | 5-305574 | 11/1993 | ........... B25B/11/00 |
| JP | 6-105568 | 4/1994 | ................ 310/331 |
| JP | 7-236287 | * 5/1995 | ............ H02N/2/00 |
| JP | 8093944 | 4/1996 | ........... F16K/31/02 |
| WO | WO 98/23868 | 11/1997 | ............. F15C/5/00 |

OTHER PUBLICATIONS

US 5,877,442, 3/1999, Freeland et al. (withdrawn)

*Primary Examiner*—Thomas M. Dougherty
(74) *Attorney, Agent, or Firm*—Young & Basile, P.C.

(57) ABSTRACT

The present invention provides an apparatus for moving a member including a first clamp assembled to a fixed surface for selectively clamping the member and a second clamp moveable with respect to the first clamp for selectively clamping the member. A piezo actuator is disposed between the first and second clamps for moving the member in response to expansion of the actuator. Resilient means bias the second clamp toward the first clamp.

20 Claims, 4 Drawing Sheets

U.S. PATENT DOCUMENTS

| | | |
|---|---|---|
| 4,319,843 A | 3/1982 | Gornall ............... 356/346 |
| 4,327,623 A | 5/1982 | Mochida et al. ......... 84/454 |
| 4,336,809 A | 6/1982 | Clark ................. 128/665 |
| 4,388,908 A | 6/1983 | Babitzka et al. ........ 123/500 |
| 4,426,907 A | 1/1984 | Scholz ................. 84/454 |
| 4,426,981 A | 1/1984 | Greiner et al. ......... 123/488 |
| 4,430,899 A | 2/1984 | Wessel ................. 73/754 |
| 4,432,228 A | 2/1984 | Kuschmierz et al. ..... 73/119 A |
| 4,434,753 A | 3/1984 | Mukainakano et al. . 123/143 B |
| 4,463,727 A | 8/1984 | Babitzka et al. ........ 123/458 |
| 4,468,583 A * | 8/1984 | Mori ................... 310/317 |
| 4,479,475 A | 10/1984 | Babitzka .............. 123/446 |
| 4,570,096 A | 2/1986 | Hara et al. ............ 310/328 |
| 4,580,540 A | 4/1986 | Babitzka et al. ........ 123/458 |
| 4,584,923 A | 4/1986 | Minnick ................ 84/454 |
| 4,612,440 A | 9/1986 | Brunnee et al. ......... 250/281 |
| 4,617,952 A | 10/1986 | Fujiwara et al. ........ 137/85 |
| 4,629,926 A | 12/1986 | Siegal ................. 310/331 |
| 4,660,523 A | 4/1987 | Brauer et al. .......... 123/458 |
| 4,667,639 A | 5/1987 | Linder et al. .......... 123/450 |
| 4,697,118 A | 9/1987 | Harnden, Jr. et al. .... 310/331 |
| 4,714,855 A * | 12/1987 | Fujimoto ............... 310/328 |
| 4,725,002 A | 2/1988 | Trachte ............... 239/102.2 |
| 4,732,071 A | 3/1988 | Deutsch ................ 84/454 |
| 4,735,185 A | 4/1988 | Imoto et al. ........... 123/498 |
| 4,736,131 A | 4/1988 | Fujimoto ............... 310/328 |
| 4,749,897 A | 6/1988 | Natsume et al. ......... 310/317 |
| 4,750,706 A | 6/1988 | Schlagmüller ......... 251/129.06 |
| 4,757,223 A | 7/1988 | Ueyama ................. 310/82 |
| 4,777,398 A | 10/1988 | Shibuya ................ 310/328 |
| 4,793,313 A | 12/1988 | Paganon et al. ......... 123/506 |
| 4,803,908 A | 2/1989 | Skinn et al. ........... 84/454 |
| 4,821,726 A | 4/1989 | Tamura et al. .......... 123/498 |
| 4,838,233 A | 6/1989 | Hayashi et al. ......... 123/506 |
| 4,857,791 A | 8/1989 | Uchino et al. .......... 310/321 |
| 4,874,979 A * | 10/1989 | Rapp ................... 310/328 |
| 4,893,750 A | 1/1990 | Haworth et al. ......... 239/71 |
| 4,909,126 A | 3/1990 | Skinn et al. ........... 84/454 |
| 4,940,037 A | 7/1990 | Eckert ................. 123/506 |
| 4,947,077 A | 8/1990 | Murata ................. 310/328 |
| 5,009,142 A | 4/1991 | Kurtz .................. 84/454 |
| 5,027,027 A * | 6/1991 | Orbach et al. .......... 310/317 |
| 5,034,647 A | 7/1991 | Ohtsuka ................ 310/328 |
| 5,038,657 A | 8/1991 | Busley ................. 84/455 |
| 5,040,514 A | 8/1991 | Kubach ................. 123/490 |
| 5,065,660 A | 11/1991 | de Buda ................ 84/200 |
| 5,072,288 A | 12/1991 | MacDonald et al. ....... 357/68 |
| 5,080,079 A | 1/1992 | Yoshida et al. ......... 123/531 |
| 5,094,429 A | 3/1992 | Dostert ............... 251/129.06 |
| 5,109,885 A | 5/1992 | Tauscher ............... 137/554 |
| 5,157,256 A | 10/1992 | Aaron .................. 250/306 |
| 5,161,774 A | 11/1992 | Engelsdorf et al. ...... 251/11 |
| 5,182,484 A | 1/1993 | Culp ................... 310/328 |
| 5,199,641 A | 4/1993 | Hohm et al. ........... 239/102.2 |
| 5,237,238 A | 8/1993 | Berghaus et al. ........ 310/328 |
| 5,314,175 A | 5/1994 | Izumi et al. ........... 269/224 |
| 5,319,257 A | 6/1994 | McIntyre ............... 310/328 |
| 5,323,680 A | 6/1994 | Miller et al. .......... 84/455 |
| 5,328,149 A | 7/1994 | Reuter ................ 251/129.06 |
| 5,332,942 A | 7/1994 | Rennex ................. 310/328 |
| 5,335,862 A | 8/1994 | Esper .................. 239/570 |
| 5,343,793 A | 9/1994 | Pattie ................. 84/454 |
| 5,390,579 A | 2/1995 | Burgon ................. 84/454 |
| 5,410,206 A | 4/1995 | Luecke et al. .......... 310/328 |
| 5,413,076 A | 5/1995 | Koenigswieser et al. ... 123/446 |
| 5,425,343 A | 6/1995 | Akaki et al. ........... 123/490 |
| 5,435,477 A | 7/1995 | Torihata et al. ........ 228/4.5 |
| 5,460,202 A | 10/1995 | Hanley et al. ......... 137/627.5 |
| 5,465,021 A | 11/1995 | Visscher et al. ........ 310/328 |
| 5,477,831 A | 12/1995 | Akaki et al. ........... 123/490 |
| 5,482,213 A | 1/1996 | Matsusaka et al. ....... 239/584 |
| 5,500,777 A | 3/1996 | Hasegawa et al. ....... 360/77.16 |
| 5,518,184 A | 5/1996 | Potz et al. ........... 239/533.4 |
| 5,645,226 A | 7/1997 | Bright ................ 239/585.1 |
| 5,685,485 A | 11/1997 | Mock et al. ........... 239/102.2 |
| 5,697,554 A | 12/1997 | Auwaerter et al. ....... 239/88 |
| 5,712,524 A | 1/1998 | Suga ................... 310/328 |
| 5,751,090 A * | 5/1998 | Henderson .............. 310/328 |
| 5,779,149 A | 7/1998 | Hayes, Jr. ............. 239/124 |
| 5,780,759 A | 7/1998 | Szalay ................. 84/454 |
| 5,780,956 A | 7/1998 | Oliver et al. .......... 310/323 |
| 5,780,957 A | 7/1998 | Oliver et al. .......... 310/328 |
| 5,803,370 A | 9/1998 | Heinz et al. .......... 239/533.9 |
| 5,810,255 A | 9/1998 | Itoh et al. ............ 239/102 |
| 5,824,929 A | 10/1998 | Freeland et al. ........ 84/454 |
| 5,824,937 A | 10/1998 | Szalay ................. 84/654 |
| 5,831,264 A | 11/1998 | Shedd et al. ........... 250/306 |
| 5,847,387 A | 12/1998 | Shedd et al. ........... 250/306 |
| 5,859,378 A | 1/1999 | Freeland et al. ........ 84/454 |
| 5,875,764 A | 3/1999 | Kappel et al. .......... 123/467 |
| 5,881,767 A | 3/1999 | Löser .................. 137/599 |
| 5,883,323 A | 3/1999 | Kaufman ................ 84/454 |
| 5,886,270 A | 3/1999 | Wynn ................... 84/313 |
| 5,901,896 A | 5/1999 | Gal .................... 228/4.5 |
| 5,907,212 A * | 5/1999 | Okada ................ 310/316.01 |
| 5,907,269 A | 5/1999 | Zrostlik ............... 335/215 |
| 5,934,976 A | 8/1999 | Makino et al. .......... 451/28 |
| 5,946,969 A | 9/1999 | Munekata et al. ........ 74/110 |
| 5,975,428 A | 11/1999 | Potschin et al. ........ 239/88 |
| 5,977,467 A | 11/1999 | Freeland et al. ........ 84/454 |
| 6,003,836 A | 12/1999 | Cewers ............... 251/129.06 |
| 6,016,040 A | 1/2000 | Hoffmann et al. ........ 318/116 |
| 6,021,760 A | 2/2000 | Boecking ............... 123/467 |
| 6,025,671 A | 2/2000 | Boecking ............... 310/369 |
| 6,035,722 A | 3/2000 | Giersch et al. ......... 73/714 |
| 6,040,643 A | 3/2000 | Bruns .................. 310/26 |
| 6,060,814 A | 5/2000 | Hoffmann et al. ..... 310/316.03 |
| 6,062,533 A | 5/2000 | Kappel et al. .......... 257/57 |
| 6,104,125 A | 8/2000 | Pan et al. ............. 310/328 |
| 6,131,879 A | 10/2000 | Kluge et al. ......... 251/129.06 |
| 6,166,307 A | 12/2000 | Caulkins et al. ........ 84/50 |
| 6,246,157 B1 * | 6/2001 | Oliver et al. ........ 310/323.02 |

\* cited by examiner

LINEAR MOTOR HAVING PIEZO ACTUATORS

CROSS-REFERENCE TO RELATED APPLICATIONS

This application claims the benefit of U.S. Provisional Application No. 60/180,239 filed Feb. 4, 2000, U.S. Provisional Application No. 60/198,056, filed Apr. 18, 2000, and U.S. Provisional Application No. 60/220,542, filed Jul. 25, 2000.

FIELD OF THE INVENTION

This invention relates to a linear motor having piezo actuators.

BACKGROUND OF THE INVENTION

Throughout industry there are numerous applications requiring a motor which is compact or small in size, powerful, precise, efficient, reliable, low cost, etc. Some prior known motors meet one or more of these desired characteristics, however, such motors have shortcomings. Some motors provide the required power but not the required precision. Other motors meet the required size but not provide the required power. Still other motors provide the required precision but are very expensive. Accordingly, it would be desirable to provide a linear motor which is capable of overcoming the shortcomings of the prior art.

SUMMARY OF THE INVENTION

An apparatus for moving a member including a first clamp assembled to a fixed surface for selectively clamping the member and a second clamp moveable with respect to the first clamp for selectively clamping the member. A piezo actuator is disposed between the first and second clamps for moving the member in response to expansion of the actuator. Resilient means bias the second clamp toward the first clamp.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
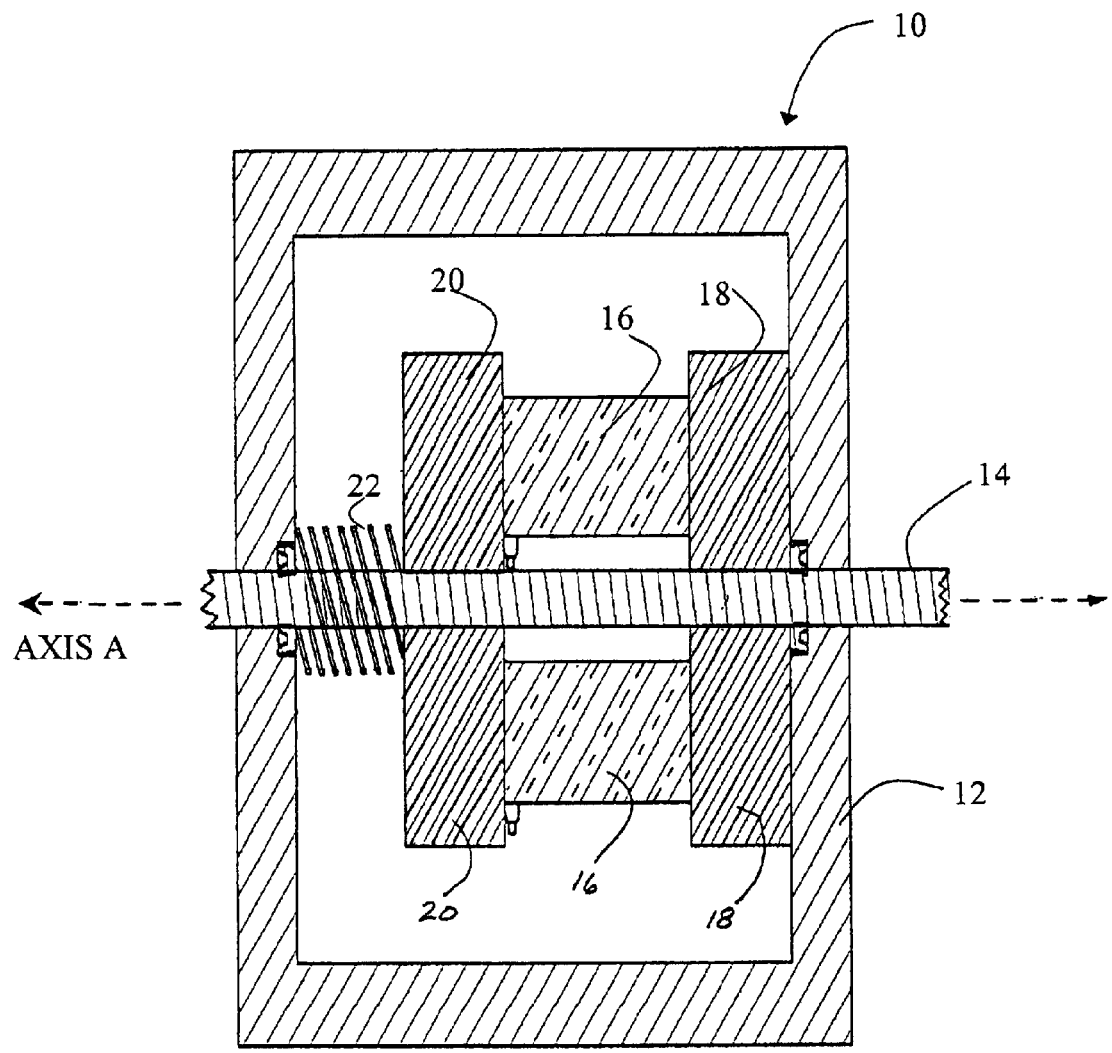
FIG. 1 is a schematic, cross-sectional view of a linear motor in accordance with the present invention showing the internal components of the motor.
Figure 2:
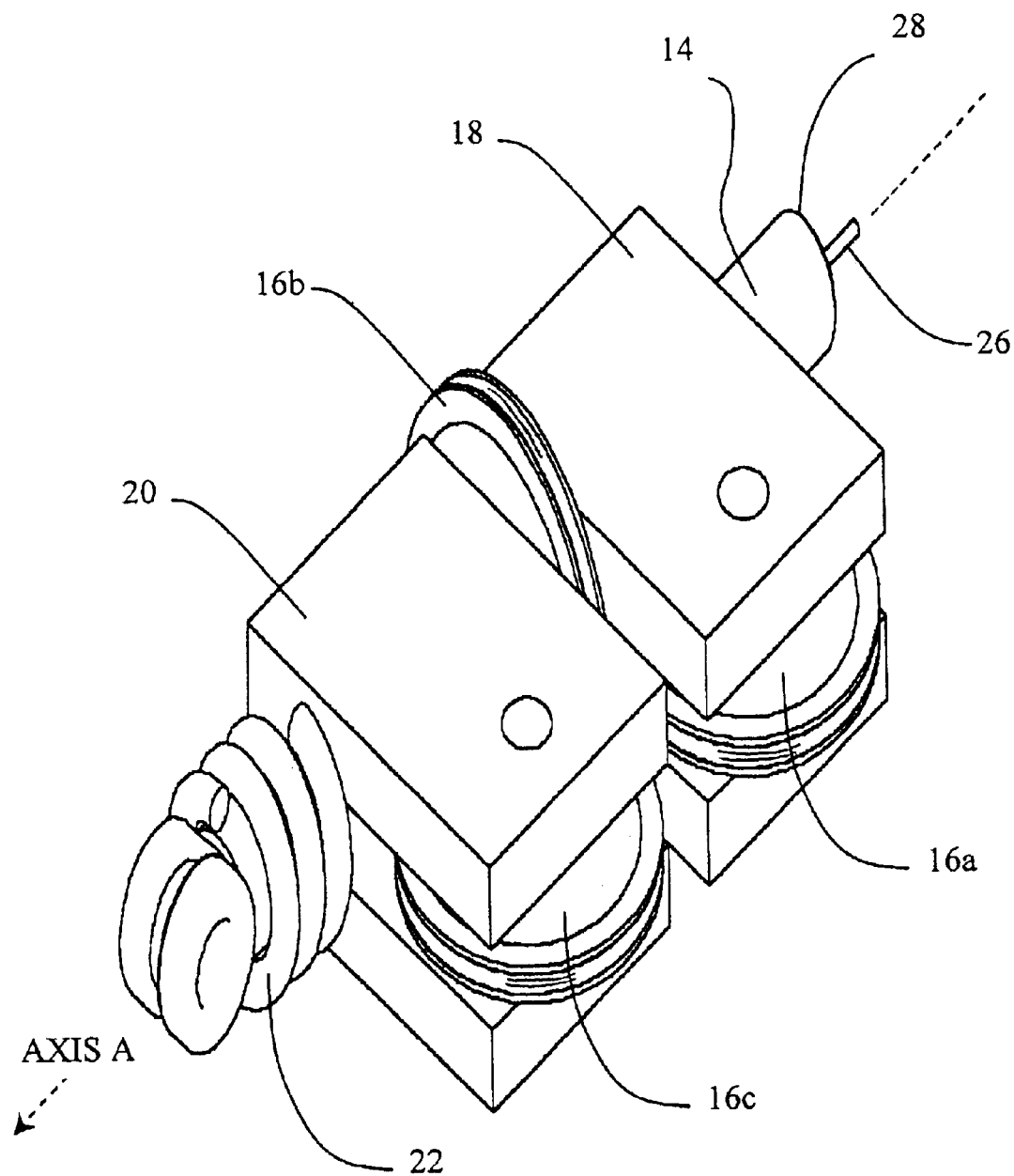
FIG. 2 is a perspective view of internal components of the linear motor.

FIG. 1 is a schematic, cross-sectional view of a linear motor 10 in accordance with the present invention showing the internal components of the motor. The linear motor 10 is shown in schematic illustration for descriptive purposes. The linear motor 10 is encased in a housing 12. The housing 12 is designed to protect the linear motor 10. In one embodiment of the present invention, the linear motor 10 is assembled to a fixed surface or member (not shown). In this embodiment, the fixed linear motor 10 is capable of moving a member, such as an actuating rod or shaft 14, in either direction along axis A in FIG. 1. In other words, the fixed linear motor 10 is capable of moving the rod 14 left or right relative to the linear motor 10 as illustrated in FIG. 1. In another embodiment of the present invention, the rod 14 is assembled to a fixed surface or member (not shown). In this embodiment, the linear motor 10 is capable of linear movement along the fixed rod 14 in either direction along axis A in FIG. 1. To accomplish either movement, the linear motor 10 operates in a walking beam feeder fashion, shown in FIG. 3 and described in greater detail below. To perform the walking beam feeder movement, the linear motor 10 includes three piezo or piezoelectric actuators 16a, 16b, and 16c (piezo actuators 16a and 16c are shown in FIG. 2), a pair of clamps 18 and 20, and a resilient means 22. The first clamp 18 is fixed to the housing 12 and the second clamp 20 is free from the housing 12. In alternative embodiments of the present invention, the resilient means 22 may comprise an actuator retractor spring (as shown in FIG. 1), an o-ring or other similar type of resilient structure, or another piezo actuator. The resilient means 22 is disposed between the second clamp 20 and the housing 12. The linear motor 10 further includes an electrical connector (not shown) for receiving power to operate the motor 10.

FIG. 2 is a perspective view of selected internal components of the linear motor 10 used to accomplish the walking beam feeder movement. The two clamps 18 and 20 are adapted to clamp or hold the rod 14. The axis of the rod 14 is aligned perpendicular to the two clamps 18 and 20. The rod 14 is disposed within the jaws of the two clamps 18 and 20. In one embodiment of the present invention, a flexible structure 26, such as a wire, cable, string or the like, may be secured to the end 28 of the rod 14 adjacent to the first clamp 18.

The two outermost actuators 16a and 16c are operated between an energized state, wherein voltage is applied to the actuator, and a de-energized state, wherein no voltage is applied to the actuator. The two outermost actuators 16a and 16c are normally de-energized. When the first actuator 16a is de-energized, the first clamp 18 is closed, or clamps to or engages the rod 14. When the third actuator 16c is de-energized, the second clamp 20 is closed, or clamps to or engages the rod 14.

Each of the three actuators 16a–c is energized by applying a voltage to the respective actuator. Energizing the first actuator 16a disengages the first clamp 18 from the rod 14. Energizing the third actuator 16c disengages the second clamp 20 from the rod 14. In other words, energizing the first actuator 16a opens the first clamp 18 thereby releasing the rod 14 and energizing the third actuator 16c opens the second clamp 20 thereby releasing the rod 14.

The second or central actuator 16b is disposed between the first and second clamps 18 and 20 providing a nominal displacement between the first and second clamps 18 and 20. When energized, the second actuator 16b provides an increase in the displacement between the two clamps 18 and 20. In other words, when energized, the second actuator 16b provides an expansion force which pushes the two clamps 18 and 20 apart or away from each other. Within the normal or typical operating voltage range, the amount of increase in the displacement between the two clamps 18 and 20 is proportional to the amount of voltage applied across the second actuator 16b.

When de-energized, the second actuator 16b provides an decrease in the displacement between the two clamps 18 and 20. Piezo actuators, especially piezo stacks, provide a contraction force significantly lower or weaker than the aforementioned expansion force and are suspectible to failure caused by tension during contraction. Accordingly, the resilient means 22 is adapted to bias or push the second clamp 20 toward the second actuator 16b. In alternative embodiments, the resilient means 22 can provide all or part of the force necessary to move the two clamps 18 and 20 back to the nominal displacement.

The operation of the three actuators 16a–c may be sequenced to move the rod 14 in one direction or the opposite direction along axis A of the rod 14. FIGS. 3A–3G are a series of schematics illustrating an operation of the linear motor 10 for moving the rod 14 in one direction. In other words, FIGS. 3A–3G illustrate a sequence of operations performed by the linear motor 10 to move the rod 14 in a direction of travel as indicated by arrow 30.

Figure 3A:
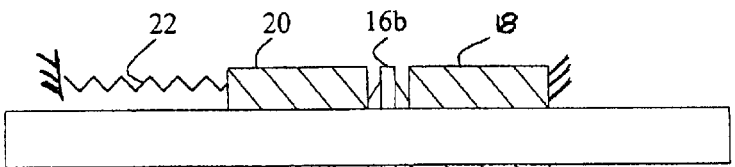
FIGS. 3A–3G are a series of schematics illustrating an operation of the linear motor of FIGS. 1 and 2 for moving a member in one direction.

FIG. 3A illustrates the linear motor 10 in a first position. The second actuator 16b is de-energized and the first and second clamps 18 and 20 are clamped to the rod 14. The first clamp 18 is fixed to the housing 12 or anchored in a fixed location or to a fixed surface. During the first operation, voltage to each of the three actuators 16a–c is switched off and the displacement between the first and second clamps 18 and 20 is nominal.

Figure 3B:
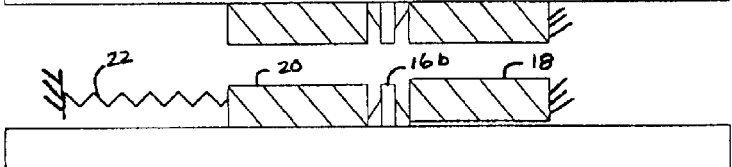

FIG. 3B illustrates the linear motor 10 in a second position. The first clamp 18 is opened by energizing the first actuator 16a. During the second operation, the rod 14 is released by the first clamp 18.

Figure 3C:
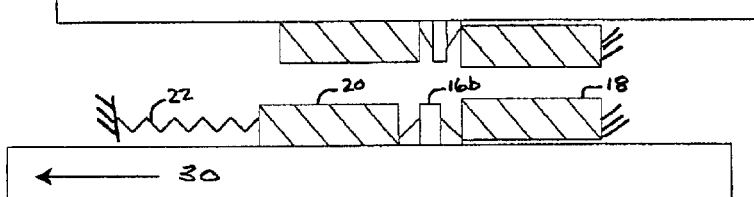

FIG. 3C illustrates the linear motor 10 in a third position. A voltage is applied to the second actuator 16b thus energizing the second actuator 16b and providing an increase in the displacement between the first and second clamps 18 and 20. During the third operation, the expansion of the second actuator 16b forces the second clamp 20 and the rod 14 in a direction of travel as indicated by arrow 30. Movement of the second clamp 20 compresses the resilient means 22 against the housing 12.

Figure 3D:
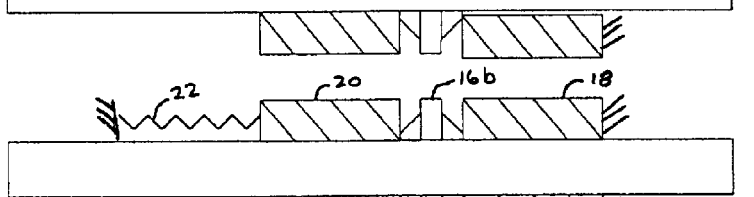

FIG. 3D illustrates the linear motor 10 in a fourth position. The first clamp 18 is closed by de-energizing the first actuator 16a. During the fourth operation, the first clamp 18 clamps to the rod 14.

Figure 3E:
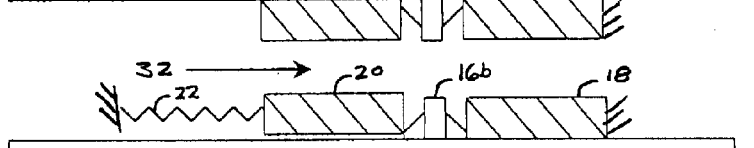

FIG. 3E illustrates the linear motor 10 in a fifth position. The second clamp 20 is opened by energizing the third actuator 16c. During the fifth operation, the rod 14 is released by the second clamp 20.

Figure 3F:
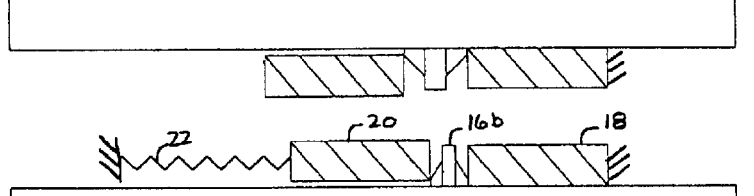

FIG. 3F illustrates the linear motor 10 in a sixth position. The second actuator 16b is de-energized. During the sixth operation, the resilient means 22 pushes the second clamp 20 in the direction of travel indicated by arrow 32.

Figure 3G:
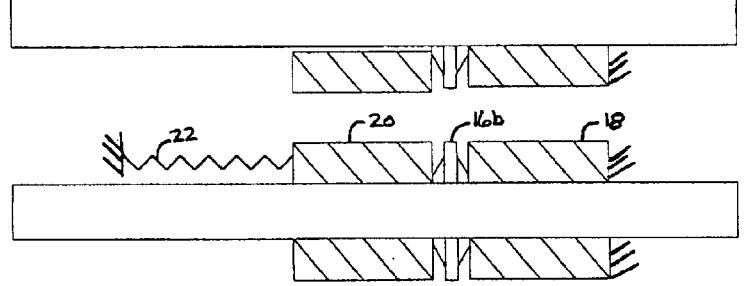

FIG. 3G illustrates the linear motor 10 in a seventh position. The second actuator 16b is de-energized and the first and second clamps 18 and 20 are clamped to the rod 14. During the seventh operation, voltage to each of the three actuators 16a–c is switched off and the displacement between the first and second clamps 18 and 20 is nominal. The seventh position is similar to the first position but with the rod 14 moved in the direction of travel as indicated by arrow 30 relative to the linear motor 10.

The linear motor 10 is capable of performing the seven step operational sequence in less than or equal to approximately 400 to 4,000 microseconds. A single cycle of the seven step operational sequence will nominally move or displace the rod 14 approximately 12 micrometers. To move or displace the rod 14 a distance greater than the nominal displacement produced by the second actuator 16b, the seven step operational sequence may be repeated or cycled two or more times. To move or displace the rod 14 a distance less than the nominal displacement produced by the second actuator 16b, the amount of voltage applied to the second actuator 16b is reduced proportionally. For example, to move or displace the rod 14 a distance of one-half the nominal displacement produced by the second actuator 16b, one-half the nominal voltage is applied to the second actuator 16b. To move or displace the rod 14 a distance of one-quarter the nominal displacement produced by the second actuator 16b, one-quarter the nominal voltage is applied to the second actuator 16b.

The sequence of operations performed by the linear motor 10 may be modified to move the rod 14 in the direction opposite of arrow 30. Further, the present invention may be practiced by combining one or more operations into a single step.

Figure 4:
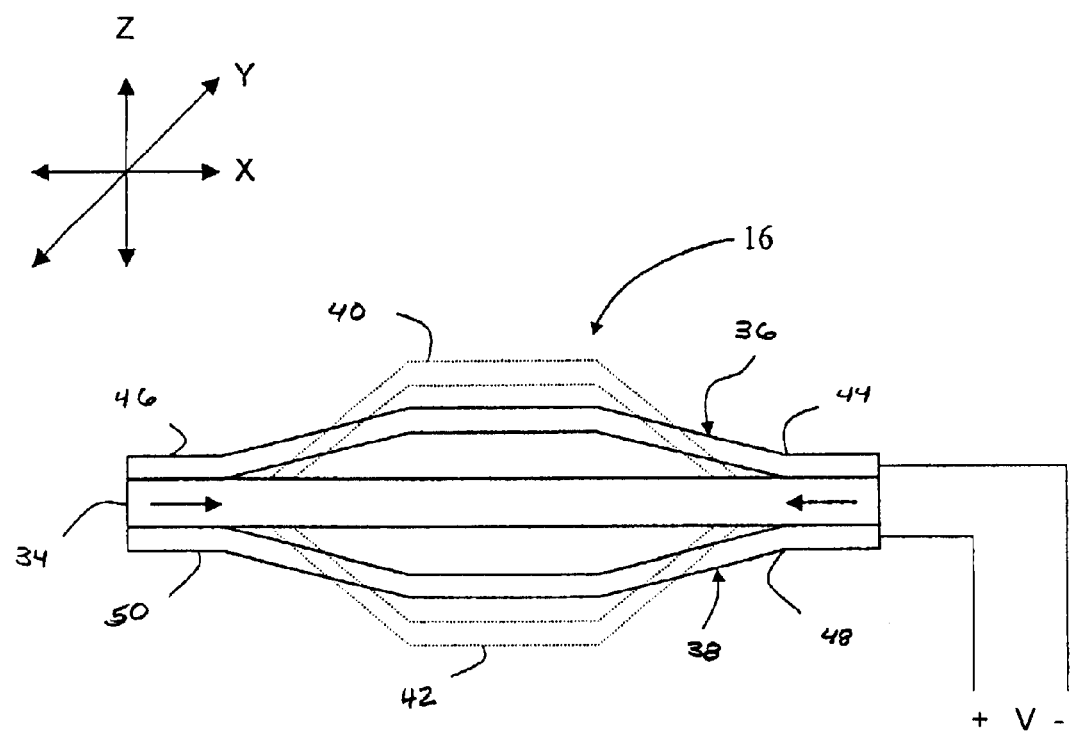
FIG. 4 is a cross-sectional view of one embodiment of an actuator for use in the linear motor.

FIG. 4 is a cross-sectional view of one embodiment of an actuator 16 for use in the linear motor 10 of the present invention. The actuator 16 is designed to produce a positional or spatial displacement along one predetermined axis when energized. In other words, the cross-section of the actuator 16 is designed to expand along at least one predetermined axis when energized. In one embodiment of the present invention, the actuator 16 includes a ceramic substrate 34 sandwiched between two opposing end caps 36 and 38. The two end caps 36 and 38 are preferably formed in the shape of truncated cones. In one embodiment of the present invention, the two end caps 36 and 38 are made from sheet metal. Each end cap 36 and 38 includes a contact surface 40 and 42 respectively. In one embodiment of the present invention, the entire periphery of each end cap 36 and 38 is bonded to the ceramic substrate 34. This type of actuator 16 is commonly referred to in the art as a cymbal actuator.

The actuator 16 is operated between a de-energized state, illustrated in FIG. 4 with solid lines, providing a spatial displacement equal to the nominal thickness of the actuator, and an energized state, illustrated in FIG. 4 with dashed lines, providing a spatial displacement greater than the nominal thickness of the actuator. The actuator 16 is normally de-energized.

The actuator 16 is energized by applying a voltage or potential across the ceramic substrate 34. The voltage causes the substrate 34 to expand along the Z axis and contract along the X and Y axes as designated in FIG. 4. As a result, both end caps 36 and 38 flex or bow outwardly from the substrate 34 about flex points 44, 46 and 48, 50 respectively. Thus, the contraction of the ceramic substrate 34 shortens the distance between the sidewalls of each end cap 36 and 38 and increases the distance between the contact surfaces 40 and 42. In this manner, a substantial increase in the displacement between the contact surfaces 40 and 42 is produced.

Within the normal or typical operating voltage range, the increase in the displacement between the contact surfaces 40 and 42 for a given cymbal geometry is proportional to the amount of voltage applied across the ceramic substrate 34. In other words, a nominal voltage produces a nominal displacement, one-half the nominal voltage produces one-half the nominal displacement, one-quarter the nominal voltage produces one-quarter the nominal displacement, etc.

The large, flat contact surfaces 40 and 42 of each end cap 36 and 38 render it practical to stack several actuators in order to achieve greater displacements.

The present invention may also be practiced with other similar types of actuators including, but not limited to, a single or individual piezoelectric element, a stack of individual piezo elements, a mechanically amplified piezo element or stack, or a multilayer cofired piezo stack.

The linear motor 10 has numerous advantages, attributes, and desirable characteristics including, but not limited to, the characteristics listed hereafter The present invention incorporates relatively simple, inexpensive, low power, reliable controls. More specifically, the linear motor 10 is compact in size (i.e. less than or equal to approximately 1 in$^3$) yet physically scalable to dimensions as least as much as a factor of ten greater and highly powerful (i.e. capable of exerting a drive thrust of 35 lbs.). The present invention is highly precise (i.e. capable of producing movement increments of approximately 0.0005 inch), highly efficient (i.e. having an average power consumption of less than 10 Watts when operating and negligible power consumption when idle), and highly reliable (i.e. having a component life expectancy of approximately 250,000,000 cycles). Further, the linear motor 10 produces minimal heat during operation, generates minimal EMI (Electromagnetic Interference) and RFI (Radio-Frequency Interference), and is relatively unaffected by stray EMI and RFI in the area. Additionally, the present invention is capable of producing an accumulated linear travel distance in excess of 2 kilometers. Finally, the linear motor 10 can operate in extreme environmental conditions including high vacuum.

What is claimed is:

1. An apparatus for moving a member comprising:
   a first clamp stationary with respect to a fixed surface and for selectively clamping the member;
   a second clamp moveable with respect to the first clamp and for selectively clamping the member; and
   a piezo actuator disposed between the first and second clamps for moving the first and second clamps apart with respect to one another in response to expansion of the plaza actuator when one of the first and second clamps is in a clamped position with respect to the member and the other at the first and second clamps is in a released position with respect to the member.

2. The apparatus of claim 1 wherein the second clamp clamps the member and actuator expansion forces the second clamp away from the first clamp.

3. The apparatus of claim 2 wherein the second clamp and the member are moved in the direction of actuator expansion.

4. An apparatus far moving a member comprising:
   a first clamp assembled to a fixed surface for selectively clamping the member;
   a second clamp moveable with respect to the first clamp for selectively clamping the member;
   a piezo actuator disposed between the first and second clamps for moving the first and second clamps apart with respect to one another in response to expansion of the actuator, and
   resilient means for biasing the second clamp toward the first clamp.

5. The apparatus of claim 4 wherein the resilient means moves the second clamp toward the first clamp in response to contraction of the actuator.

6. A method for moving a member with an apparatus having a fixed surface and a first clamp stationary with respect to the fixed surface, a moveable second clamp, and a piezo actuator disposed between the first and second clamps comprising the stops of:
   closing the first and second clamps to clamp the member;
   opening the first clamp to release the member;
   expanding the piezo actuator to move the second clamp and member in a direction away from the first clamp;
   closing the first clamp to clamp the member;
   opening the second clamp to release the member; and
   contracting the piezo actuator.

7. A method for moving a member with an apparatus having a fixed first clamp, a moveable second clamp, and a piezo actuator disposed between the first and second clamps comprising the steps of:
   closing the first and second clamps to clamp the member;
   opening the first clamp to release the member;
   expanding the piezo actuator to move the second clamp and member a direction away from the first clamp;
   closing the first clamp to clamp the member;
   opening the second clamp to release the member;
   contracting the piezo actuator, and biasing the second clamp toward the first clamp.

8. The apparatus of claim 1 anther comprising the first clamp responsive to energization to move from a normally closed position engaging the member to an opened position disengaged from the member.

9. The apparatus of claim 1 further comprising the second clamp responsive to energization to move from a normally closed position engaging the member to an opened position disengaged from the member.

10. The apparatus of claim 1 further comprising a first piezo actuator for moving the first clamp to an opened position, wherein the first clamp is disengaged from the member.

11. The apparatus of claim 1 further comprising a second piezo actuator for moving the second clamp to an opened position, wherein the second clamp is disengaged from the member.

12. The apparatus of claim 1 further comprising:
    resilient means for biasing the first and second clamps toward one another.

13. The apparatus of claim 4 further comprising the first clamp being responsive to energization to move from a normally closed position engaging the member to an opened position disengaged from the member.

14. The apparatus of claim 13 further comprising a first piezo actuator for moving the first clamp to an opened position, wherein the first clamp is disengaged from the member.

15. The apparatus of claim 4 further comprising the second clamp being responsive to energization to move from a normally closed position engaging the member to an opened position disengaged from the member.

16. The apparatus of claim 15 further comprising a second piezo actuator for moving she second clamp to an opened position, wherein the second clamp is disengaged from the member.

17. The method of claim 6 further comprising the step of energizing the first clamp to move from a normally closed position engaging the member to an opened position disengaged from the member.

18. The method of claim 17 wherein the energizing step further comprises the step of energizing a first piezo actuator for moving the first clamp to an opened position disengaged from the member.

19. The method of claim 6 further comprising the step of energizing the second clamp to move from a normally closed position engaging the member to an opened position disengaged from the member.

20. The method of claim 19 wherein the energizing step further comprises the step of energizing a second piezo actuator for moving the second normally closed clamp to an opened position disengaged from the member.

* * * * *